United States Patent [19]
Dalgard et al.

[11] 3,869,550
[45] Mar. 4, 1975

[54] METHOD FOR THE CONTROL OF FERTILITY

[75] Inventors: Dan W. Dalgard, Springfield, Va.;
Donald E. Coval, Sheridan, Ind.

[73] Assignee: Environmental Science Corporation, Vienna, Va.

[22] Filed: Apr. 11, 1973

[21] Appl. No.: 349,285

Related U.S. Application Data

[63] Continuation-in-part of Ser. No. 249,230, May 1, 1972, abandoned.

[52] U.S. Cl. .............................. 424/227, 424/329
[51] Int. Cl. ............................................ A61k 27/00
[58] Field of Search ........................... 424/329, 227

[56] References Cited
UNITED STATES PATENTS

| | | | |
|---|---|---|---|
| 2,907,693 | 10/1959 | Price et al. | 424/329 |
| 3,085,933 | 4/1963 | Schooley et al. | 424/329 |
| 3,164,607 | 1/1965 | Lednicer | 260/326.5 |
| 3,272,701 | 9/1966 | Kaitz et al. | 424/329 |
| 3,277,106 | 10/1966 | Bencze et al. | 260/295 |
| 3,497,559 | 2/1970 | Petracek | 424/329 |
| 3,686,416 | 8/1972 | Myer et al. | 424/329 |

OTHER PUBLICATIONS

Chem. Abst., 8th Collective Index, Vol. 66-75, (1967-1971), pages 2091S & 2092S.
Khera et al., Chem. Abst., Vol. 73, (1970), page 54378e.

*Primary Examiner*—Sam Rosen
*Attorney, Agent, or Firm*—Laurence, Stokes & Neilan

[57] ABSTRACT

A method and composition for the control of fertility comprising an antifertility effective compound selected from the group consisting of a. a quaternary ammonium compound of the formula

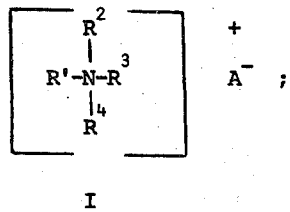

I b. a complex of a quaternary ammonium compound of Formula I and a tetracycline;
c. mixtures of quaternary ammonium compounds of Formula I; and,
d. complexes of (c) and a tetracycline.

13 Claims, No Drawings

METHOD FOR THE CONTROL OF FERTILITY

This application is a continuation-in-part of copending application Ser. No. 249,230 filed May 1, 1972 by the present applicants, now abandoned.

This invention is directed to a method of controlling fertility, especially in animals, especially mammals. This invention is further directed to a composition for the control of fertility in mammals.

Recently much concern has been expressed by civic and humanitarian leaders regarding the "population explosion" in both humans and animals.

Of concern is the eradication of rodent and wild animals population by a means which does not employ poisons which are potentially dangerous to humans especially children and/or domestic animals.

Many of the means presently employed in the control of fertility, especially in animals, comprise non-reversible processes or produce side effects because of the prolonged utilization of the effective compounds limiting their usefulness.

Procedures utilizing contraceptive compounds normally require the administration of the compounds during regular cycles in order to prevent conception. These present methods do not normally prevent conception if the contraceptive compound is administered after "mating".

It is thus an object of this invention to overcome the disadvantages enumerated above.

It is another object of this invention to provide a composition having antifertility properties.

It is still another object of this invention to provide a composition having antifertility properties in post mating utilization.

It is a further object of this invention to provide a method for the control of fertility, i.e., reproduction.

It is still further an object of this invention to provide a method for the control of fertility in animals, especially mammals.

It is a yet still further object of this invention to provide a cat and/or dog food which will control fertility in the animal.

Further objects, advantages and aspects of this invention will be apparent from the following description.

In the control of fertility, it is not always possible to ensure that the subject will receive the effective composition prior to mating. This is especially pertinent in the control of the wild animal population by the interruption of their reproductive capabilities.

It has now been found that quaternary ammonium compounds have the capability of controlling fertility if administered at the time of mating or within an effective period after mating. It has also ben found that the antifertility compounds of the invention may, if desired be utilized in the form of a quaternary ammonium tetracycline complex.

The quaternary ammonium compound of this invention is characterized by the following formula:

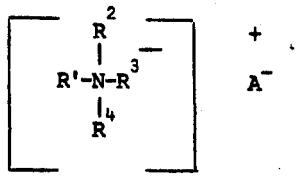

wherein $R'$ is selected from the group consisting of alkyl having a maximum of 22 carbon atoms, phenyl, benzyl, $R^5O-$ and $HOR^6O-$, wherein $R^5$ is alkyl having a maximum of 5 carbon atoms and $R^6$ is alkylene having a maximum of 5 carbon atoms; $R^2$, $R^3$ and $R^4$ are each independently alkyl having a maximum of 20 carbon atoms and $A^-$ is a pharmaceutically acceptable anion.

In a preferred embodiment of this invention $R^2$, $R^3$ and $R^4$ are each independently alkyl having a maximum of five carbon atoms.

In another preferred embodiment of this invention $R'$ is preferably alkyl having at least 12 and a maximum of 18 carbon atoms.

In another preferred embodiment of this invention $R'$ and $R^2$ are the same and are alkyl having a maximum of 20 carbon atoms and $R^3$ and $R^4$ are the same and are alkyl having a maximum of five carbon atoms.

With regard of the definition of $R'$, the term "alkyl" includes the aliphatic hydrocarbon groups which are derived from natural fats and oils. Such hydrocarbon groups contain primarily saturated linkages, but may contain from one to four unsaturated linkages, and therefore are sometimes also referred to as alkylene groups. As used herein the term "alkyl" therefore refers to both saturated alkyl and unsaturated alkylene groups which contain from 12 to 22 carbon atoms. Animal fats and oils and vegetable oils are sources of mixed alkyl groups where the alkyl groups contain predominantly from 16 to 18 carbon atoms. Where unsaturated linkages are present, they can be converted to saturated linkages by hydrogenation. For example, alkyl groups derived from animal fats, such as tallow are composed predominantly of saturated $C_{16}$ and $C_{18}$ alkyl groups. More specifically, these are hexadecyl and octadecyl aliphatic hydrocarbon groups, as derived respectively from palmitic and stearic acids. Where unsaturated $C_{16}$ or $C_{18}$ groups are present, such as those derived from palmitoleic or linoleic acids, they can be completely or partially converted to the saturated hexadecyl or octadecyl groups. In one embodiment of the present invention, long chain alkyl groups of the quaternary ammonium compound are provided by alkyl groups which are either all saturated hexadecyl or octadecyl groups, or which are provided by mixtures of alkyl groups wherein at least from 75 to 100 percent by weight of the alkyl groups are saturated $C_{16}$ or $C_{18}$ groups, that is, saturated hexadecyl or octadecyl groups.

Examples of pharmaceutically acceptable anions include, but are not limited to, the halides (chloride, bromide and iodide), nitrates, nitrites, phosphates, sulfites, sulfonates, sulfates, acetates, citrates, tartrates, maleates, oxalates, cyclic acid salts, lactates, stearates and the like. The halides, especially the chlorides, are the preferred anion.

Examples of alkyl groups useful in this invention include, but are not limited to, methyl, ethyl, propyl, octyl, decyl, lauryl, myristyl, palmityl, stearyl, oleyl, linoleyl, arachadonyl and the like and mixtures of these groups.

The amines of this invention are commercially available or are easily prepared according to standard procedures which are within the skill of the ordinary chemist. For the amines having alkyl groups of $C_{12}$ to $C_{22}$, it is more feasible to utilize mixtures of amines which are commercially available.

Quaternary ammonium compound tetracycline complexes are also commercially available or easily prepared utilizing standard procedures. The preparation of complexes is illustrated in U.S. Pat. No. 2,873,276.

The specific quaternary ammonium compounds which have been found useful in the compositions of this invention include monotallow trimethylammonium halides, especially monotallow trimethylammonium chloride; tetramethylammonium iodide; diethyl dimethylammonium chloride; trimethylbenzyl ammonium chloride; trimethyl octadecyl ammonium chloride; trimethyl cocodecylammonium chloride; trimethyl dodecylammonium chloride; trimethyl hexadecylammonium chloride; trimethyl soya ammonium chloride; benzyl dimethylpentyl ammonium chloride; dimethyl dioctadecylammonium acetate; dodecyldimethylbenzyl ammonium chloride; ethylbenzyldimethylammonium chloride; methyltrioctadecylammonium chloride; cetyl trimethylammonium bromide; tetraethylammonium bromide; trialkyloctadecyl ammonium stearate; trimethyl hexadecyl ammonium stearate; trimethyloctadecyl ammonium phosphate, trimethyl chaulmoogrylammonium bromide; trimethyl heptadecylammonium citrate; triethyl hydrocarpylammonium tartrate; stearyldimethylbenzylammonium chloride, and mixtures thereof.

The mechanism by which the effective compounds exert their activities is not completely understood. The compounds are active only when administered to the female of the species. As it will be shown in the experimental section, the administering of the active compounds prevented conception in some species while in others there was evidence of resorptions. The effective compoundn may thus be embryocidal, ovicidal and/or spermicidal.

The mode of administration is by any of the conventional means for administering pharmaceutical preparations such as tablet, capsule, liquid and injection. In addition, and especially when administered to animals, the active material may be incorporated in the animal feed or bait.

The compounds of this invention have been administered over the time period from prior to mating to the period after mating but prior to implantation of the egg or fertilized egg in the uterine wall. In most instances satisfactory results were obtained even though the compound was not administered until after mating.

Although the compounds have been found to exert a residual effect, it is recommended that the compound be administered over a period of several days and preferably at the time of mating.

The time period which elapses between mating and the implantation and/or fertilization of the egg is known for the different female species and thus the time for beginning the administering of the composition is easily calculated.

The tetracycline compound, when employed, and the quaternary ammonium compound are usually present in the complex in the approximate ratio range (based on weight percent) of tetracycline to quaternary ammonium compound of 3/1 to 10/1.

The term mammal includes but is not limited to rodents, lagomorphs and insectivores such as rats, mice, moles, ground hogs, nutria, bats, guinea pigs, gerbils, rabbits and the like; carnivores, ungulates and primates such as cats, dogs, ferret, chimpanzees, and monkeys, as well as man.

In this specification and the appended claims, the term "tetracycline" is being used to include tetracycline, oxytetracycline and chlortetracycline unless otherwise specified. The term "complex" is utilized to define the quaternary ammonium compound - tetracycline complex.

The compounds of the present invention can be prepared and administered to mammals, i.e., humans and animals, in a wide variety of oral and parenteral dosage forms.

For preparing pharmaceutical compositions from the physiologically active compounds of this invention, pharmaceutically acceptable carriers can be either solid or liquid. Solid form preparations, include powders, tablets, dispersible granules, capsules, cachets and suppositories. A solid carrier can be one or more substances which may also act as diluents, flavoring agents, solubilizers, lubricants, suspending agents, binders or tablet-disintegrating agents; it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 to 10 to 60% of the active ingredient. Suitable solid carriers include magnesium carbonate, magnesium stearate, talc, sugar, lactose, pectin, dextrin, starch, gelatin, tragacanth, methyl cellulose, sodium carboxymethylcellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispersing the finely-divided compound in water with viscous material, natural or synthetic gums, resins, etc., for example, gum arabic, ion-exchange resins, methylcellulose, sodium carboxymethylcellulose and other well known suspending agents.

Preferably, the pharmaceutical preparation is in unit dosage form. In such form the preparation is subdivided into unit doses containing appropriate quantities of the compound. The unit dosage form can be a packaged preparation, the package containing discrete quantities of preparation, for example, packeted powders of vials or ampules.

The unit dosage form can be a capsule, cachet or tablet itself, or it can be the appropriate number of any of these in packaged form. The quantity of compound in a unit dose of preparation may be varied or adjusted from 5 mg. to 1000 mg. (generally within the range of 5 to 250 mg.) according to the particular application intended and the potency of the active ingredient employed.

The claimed compositions having the stated physiological activity can be incorporated into pharmaceutical formulations including sustained-release agents.

In use as an antifertility preparation, the preparations of the present invention are administered at the initial dosage of about 5 to 300 mg. per kilogram daily. The dosages, however, may be varied depending upon the requirements of the subject.

It is understood that the pharmaceutical preparations described may be formulated in unit dosage form for veterinary use, and especially, for use with cats and dogs.

In a related aspect, novel and useful compositions are provided in this invention which comprise at least one active ingredient compound within the scope of this invention in admixture with an animal feed, especially for pets such as cats and dogs. Description of suitable feeds can be found in the book "Feeds and Feeding" by Frank B. Morrison, published by the Morrison Publishing Company of Ithaca, N.Y., 1948, 21st Edition. The selection of the particular feed is within the knowledge of the art and will depend of course on the animal, the economics, natural materials available, the surrounding circumstances and the nature of the effect desired, as will be readily understood.

A particularly important composition according to this feature of the invention is a concentrate, suitable for preparation and sale to a farmer or pet owner for addition to the animal's feedstuffs in appropriate proportion. These concentrates ordinarily comprise about 0.5% to about 30% by weight of the active ingredient compound together with a finely divided solid, preferably flours, such as wheat, corn, soya bean, ground horse meat, fishmeal, and the like. Depending on the excipient animal, the solid adjuvant can be ground cereal, fishmeal, charcoal, fuller's earth, oyster shell, canned cat or dog food, and the like.

The feed compositions, as well as the just-described concentrates, can additionally contain other components of feed concentrates or animal feeds, as will be readily understood. Other particularly important additives include proteins, carbohydrates, fats, vitamins, minerals, antibiotics, such as tetracycline compounds, etc.

Although the quaternary ammonium compounds of this invention may be incorporated into feed compositions, it is preferably that the active compound be administered by way of a pharmaceutical composition in unit dosage form so as to regulate the amount of intake by the animal and to make certain that an effective antifertility amount is consumed.

In accordance with another embodiment of this invention, the active quaternary ammonium salt is used in combination with a tetracycline compound such as oxytetracycline (Terramycin) or chlortetracycline (Aureomycin). The quaternary ammonium compound may be utilized as an entity separate from the tetracycline compound or the two entities may be combined and utilized as a quaternary ammonium tetracycline complex. Tetracycline compounds of this invention are preferably tetracycline and its derivatives such as oxytetracycline (Terramycin) and chlortetracycline (Aureomycin).

It has been found that fertility can be controlled or reduced upon the administration of 5 to 300 mgm/kg/day of the quaternary ammonium compound. The preferred rate of administration in general is from 10 to 200 mgm/kg/day. For given species the preferred range will of course vary, for example, for dogs and cats the presently preferred range is 10 to 20 mgm/kg/day.

The amount of tetracycline associated with this range of quaternary ammonium compound, when the complexes are utilized, is easily calculated from the above ratio range.

Administration of about 10 mgm/kg/day has been found to be extremely effective in the dog to prevent fertility.

The following examples illustrate the effectiveness of the compounds of this invention and the various time periods over which the administering of the compounds were initiated.

EXAMPLE 1

This example illustrates the effectiveness of a quaternary ammonium-tetracycline complex.

A group of seven brood bitches — known as breeders — were divided into a group of five and a control group of two dogs. Both groups of dogs were fed the same feed with the exception that a quaternary ammonium-tetracycline complex was added at a rate equivalent to 500 mgm. of terramycin per pound of feed. The ratio of terramycin to quaternary ammonium compound in this complex was approximately 5/1. The quaternary ammonium compound utilized was a commercial monotallow trimethylammonium chloride or the formula $[RN(CH_3)_3]^+Cl^-$ wherein R had the approximate composition

| myristic | C-14 | 3.0% |
| pentadecylic | C-15 | 1.0% |
| palmitic | C-16 | 29.0% |
| margaric | C-17 | 1.5% |
| stearic | C-18 | 19.0% |
| palmitoleic | C-16 | 3.0% |
| oleic | C-18 | 40.0% |
| linoleic | C-18 | 3.5% |

Based upon normal feeding habits of these dogs, it is calculated that each dog consumed approximately 10–12 mgm/kg/day of quaternary ammonium compound.

This group of five dogs was administered the complex for approximately six weeks prior to breeding.

The same stud dog was utilized in breeding both groups of dogs. The two control dogs became pregnant and delivered normal litters of pups. In the group of five dogs which were administered the complex, no pregnancy was noted.

EXAMPLE 2

In a controlled experiment similar to Example 1, the complex was fed only to the stud dog and not to the females at the same rate as in Example 1. In all instances the females became pregnant.

EXAMPLE 3

This example illustrates the time period over which the active compound may be administered and still exhibit activity.

In this example both the male and female dog were administered the complex in the feed as in Example 1.

The results were compiled and listed in Table I which show the number of female dogs (bitches), the number of days between initiation of administering the complex and breeding (a positive number indicates initiation of complex occurred after breeding), and the number of pregnancies and non-pregnancies.

TABLE I

| No. of Dogs | No. of Intervening Days | No. Pregnancies | No. Non-Pregnancies | Comments |
|---|---|---|---|---|
| 1 | 19 | 0 | 1 | |
| 3 | 18 | 2 | 1 | |
| 4 | 17 | 2 | 1 | 1 reduced litter |
| 8 | 15 | 3 | 5 | 1 aborted |
| 2 | 14 | 0 | 2 | |
| 3 | 11 | 0 | 3 | |
| 5 | 10 | 0 | 5 | |
| 3 | 8 | 0 | 3 | |
| 2 | 6 | 0 | 2 | |
| 1 | 4 | 0 | 1 | |
| 3 | 1 | 0 | 3 | |
| 2 | 0 | 0 | 2 | |
| 2 | −1 | 0 | 2 | |
| 4 | −2 | 0 | 4 | |

Dogs bred more than 19 days prior to initiation of administration of the complex generally became pregnant and are not included in Table I. Likewise, dogs bred after initiation of administration of the complex generally did not became pregnant and thus the results, which would only be cumulative, are not included in Table I.

A review of Table I will show that for the control or reduction of fertility in dogs, the administration of the active compound should be initiated no later than 19 days after breeding and preferably within 15 days of breeding.

EXAMPLE 4

This example illustrates the effectiveness of quaternary ammonium compounds alone.

Three groups of rats, containing 5, 6 and 5 rats respectively, were fed a feed to which was added a quaternary ammonium compound having essentially the same composition as in Example 1. The rats received essentially the amount shown in Table II. The quaternary ammonium compound was administered to the rats for 14 days prior to breeding. The rats were sacrificed on the 16th day of gestation. The results obtained are tabulated in Table II.

In Group 2 (30 mg/kg/day) normal developing feti were noted in each case. The number of feti in each animal varied as did the number of resorption sites.

In Group 3 (3 mg/kg/day), four of the five rats (80%) developed approximately the same number of normal feti. One rat had no feti or resorption sites.

Similar results were obtained at reduced rates when the compound was administered to dogs.

Similar results may be obtained utilizing either cetyltrimethylammonium bromide, tetraethylammonium bromide, stearyldimethylbenzyl ammonium chloride; trimethyloctadecylammonium chloride; trimethylcocodecylammonium chloride; trimethyldodecylammonium chloride; trimethylhexadecylammonium chloride; trimethyl soya ammonium chloride; benzyldimethylpentyl ammonium chloride; dimethyldioctadecylammonium acetate; dodecyldimethyl benzyl ammonium chloride and trimethylhexadecylammonium stearate, as the quaternary ammonium compound.

EXAMPLE 5

This example illustrates the apparent ineffectiveness of tetracycline alone.

TABLE II

| Female No. | No. of Normal Developing Feti | No. of Resorptions |
|---|---|---|
| | Group No. 1 — 300 mg/kg/day (calculated dose) | |
| 1 | 0 | 0 |
| 2 | Did not breed during 28-day mating period | |
| 3 | 0 | 7 |
| 4 | 0 | 8 |
| 5 | 0 | 7 |
| | Group No. 2 — 30 mg/kg/day (calculated dose) | |
| 6 | 13 | 1 |
| 7 | 11 | 1 |
| 8 | 5 | 0 |
| 9 | 10 | 1 |
| 10 | 11 | 0 |
| 11 | 8 | 2 |
| | Group No. 3 — 3 mg/kg/day (calculated dose) | |
| 12 | 10 | 0 |
| 13 | 0 | 0 |
| 14 | 11 | 1 |
| 15 | 12 | 0 |
| 16 | 11 | 0 |

As seen in Table II, the rats in Group 1 (300 mg/kg/day) showed no development of feti. The number of resorption sites in the uterus confirms the fact that conception had taken place.

Three breeding females were fed 500 mgm per day, in two 250 mgm doses, of terramycin prior to breeding and for 65 days post breeding. The results are tabulated in Table III. The number of days is the elapsed time from initiation of administering the active compound to the day the dog was bred.

TABLE III

| Female No. | Days | RESULTS |
|---|---|---|
| 1 | 22 | Pregnant |
| 2 | 24 | Pregnant |
| 3 | 17 | Pregnant |

These results are different from the results shown in Example 3 in which the quaternary-tetracycline complex was found to be effective and that the administration can be initiated up to approximately 14–15 days after breeding.

EXAMPLE 6

This example illustrates that, upon removal of the active component, normal conception rates were obtained.

The feed of animals which contained the complex as in Example 3 was replaced with a feed free of the complex. The return of normal conception rates was tabulated in Table IV. The number of days is the elapsed time from withdrawal of the complex to date of breeding.

TABLE IV

| Days | No. Bred | No. Conceived | No. Not Pregnant |
|---|---|---|---|
| 0 | 2 | 1 | 1 |
| 3 | 1 | 1 | 0 |
| 4 | 7 | 3 | 4 |
| 5 | 5 | 1 | 4 |
| 6 | 7 | 4 | 3 |
| 7 | 2 | 2 | 0 |
| 8 | 2 | 0 | 2 |
| 10 | 4 | 2 | 2 |
| 11 | 2 | 1 | 1 |
| 12 | 2 | 2 | 0 |
| 13 | 1 | 0 | 1 |
| 14 | 3 | 3 | 0 |
| 15 | 5 | 4 | 1 |
| 17 | 5 | 5 | 0 |
| 18 | 7 | 5 | 2 |
| 19 | 5 | 3 | 2 |
| 20 | 2 | 1 | 1 |
| 21 | 7 | 6 | 1 |
| 22 | 4 | 4 | 0 |
| 25 | 3 | 3 | 0 |

The erratic nature of the early results of Table IV is due to the procedure in which the feed with complex was replaced with "free" feed. Instead of removing all the feed with added complex and substituting free feed, free feed was added to the "medicated" feed (feed with complex) and thus gradually diluting the amount of complex in the feed.

EXAMPLE 7

This example illustrates the effectiveness of the quaternary ammonium compound in dogs when fed at two levels.

Ten proven bitches were fed the quaternary ammonium compound at 0.03% of the diet from the time of estrus until 65 days following mating. The table below presents the results of mating.

TABLE V

| Animal | No. of Live Offspring | No. of Stillbirths |
|---|---|---|
| ZEJ | 5 | 2 |
| QBH | 1 | 0 |
| QEI | 2 | 2 |
| QAF | 0 | 0 |
| MMX | 0 | 0 |
| ZKU | 0 | 0 |
| QPX | 0 | 0 |
| ZST | 0 | 0 |
| QBJ | 0 | 0 |
| MMQ | 0 | 0 |

A second group of five proven bitches were handled in an identical fashion except that the quaternary ammonium compound was fed at 0.3% of the diet. None of the animals became pregnant.

From the above it can be seen that the quaternary ammonium compound at a dietary level of 0.3% completely prevents pregnancy and that a level of 0.03% dramatically reduces the rate of conception.

EXAMPLE 8

A feed for cats or dogs is prepared as follows:

| | |
|---|---|
| Oat groats | 350 lbs. |
| Horsemeat, ground | 1000 lbs. |
| Molasses | 100 lbs. |
| Soybean meal | 450 lbs. |
| Dried skim milk | 100 lbs. |
| Ground limestone | 20 lbs. |
| Dicalcium phosphate | 20 lbs. |
| Salt plus trace mineral mix | 10 lbs. |
| Standard vitamin premix | 1 lb. |
| | 2051 lbs. |

According to this invention there is added to the foregoing cats or dogs food (or otherwise added to the animal diet) a concentrate of trimethyl soya ammonium chloride, in an amount that provides about 60–200 mg. of trimethyl soya ammonium chloride per pound of feed based on the dry weight of total feed composition.

It has been found that feeding a 10 kilogram female dog 1 pound of the feed containing 60–200, illustratively 100, mg of the quaternary ammonium compounds per pound of dry feed is effective to prevent fertility.

EXAMPLE 9

A large number of unit capsules for oral administration are prepared by filling standard two-piece hard gelatin capsules weighing about 50 milligrams each with 50 milligrams of powdered trimethyloctadecyl ammonium chloride.

EXAMPLE 10

Example 9 is repeated except that soft gelatin capsules are use, each also containing about 25 milligrams of stearic acid.

EXAMPLE 11

Example 9 is repeated except that the dosage unit is 50 milligrams of active ingredient, 2.5 milligrams of gelatin, 2.5 milligrams of magnesium stearate and 100 milligrams of starch, mixed and formed into a tablet by a conventional tableting machine. Slow release pills or tablets can also be used.

EXAMPLE 12

A parenteral composition suitable for administration by injection is prepared by stirring 5% by weight of the active ingredient of Example 9 in sterile aqueous 0.9% saline.

A large variety of compositions according to this invention can thus readily be made by substituting other compounds of this invention, including specifically but not being limited to compounds of this invention that have specifically been named hereinbefore. The compounds will be used in the amounts indicated in accordance with procedures well known and described in "The Pharmacological Basis of Therapeutics" by L. G. Goodman and A. Gilman.

EXAMPLE 13

To prepare 1000 tablets, each containing 25 mg. of monotallow trimethylammonium chloride, the following ingredients are used:

| | |
|---|---|
| monotallow trimethylammonium chloride | 25.0 gm. |
| milk sugar | 164.12 gm. |
| ethylcellulose | 0.1 gm. |
| corn starch | 13.0 gm. |
| sodium benzoate | 0.02 gm. |
| talc | 4.7 gm. |
| Acacia powder | 2.5 gm. |
| magnesium stearate | 1.5 gm. |

A tablet granulation is prepared from these ingredients by admixing said active compound with a starch paste comprising the corn starch, milk sugar, sodium benzoate, ethyl cellulose and acacia powder in a sufficient amount of water to provide a pasty consistency. The mixture is worked until it granulates and then passed through a large mesh screen (e.g., no. 16). The granules are dried and then put through a no. 20 screen and mixed with the previously sieved talc and magnesium stearate. The resulting granulation is then pressed into tablets, each containing the specified amount of active ingredient.

In the same manner, all the other compounds utilizable within the purview of this invention may be tableted.

It has been found that other quaternary ammonium compounds such as cetyltrimethylammonium bromide, tetraethylammonium bromide, stearyldimethylbenzyl ammonium chloride, trimethyl octadecylammonium chloride, trimethyl cocodecylammonium chloride, trimethyldodecylammonium chloride, trimethylhexadecylammonium chloride, trimethylsoyaammonium chloride, benzyl dimethylpentyl ammonium chloride, dimethyl dioctadecylammonium acetate, dodecyldimethylbenzyl ammonium chloride and trimethylhexadecyl ammonium stearate can also be formulated to provided an anti-fertility preparation of the same type shown in Example 13, which acts as an effective anti-fertility agent when administered to cats and dogs in the manner of Example 4 or 7.

Although the above examples were limited to the effect on animals, this method is also effective when utilized by humans.

In addition, the administering of the active ingredient by adding to the feed was for convenience only. As discussed previously, the other standard methods of administering pharmaceuticals is preferably utilized instead of adding the active component to the feed.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and the description set forth herein but rather the claims be construed as encompassing all the features of patentable novelty which reside in the present invention including all features which would be treated as equivalents thereof by those skilled in the art to which the invention pertains.

What is claimed is:

1. A method for the control of fertility in a female mammal comprising administering to the female mammal at the time of mating or within an effective period thereafter an anti-fertility effective amount of a compound selected from the group consisting of a. a quaternary ammonium compound of the formula

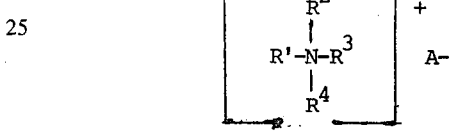

wherein R' is selected from the group consisting of alkyl having a maximum of 22 carbon atoms, phenyl, benzyl, $R^5O-$ and $HOR^6O-$, wherein $R^5$ is alkyl having a maximum of 5 carbon atoms and $R^6$ is alkylene having a maximum of 5 carbon atoms; $R^2$, $R^3$ and $R^4$ are each independently alkyl having a maximum of 20 carbon atoms; and A is a pharmaceutically acceptable anion; and b. mixtures of more than one such quaternary ammonium compound.

2. A method in accordance with claim 1 in which $R^2$, $R^3$ and $R^4$ are each independently alkyl having a maximum of five carbon atoms.

3. A method in accordance with claim 2 in which R' is alkyl having at least 12 and a maximum of 18 carbon atoms.

4. A method in accordance with claim 1 in which the quaternary ammonium compound is complexed with a tetracycline.

5. A method in accordance with claim 4 wherein said quaternary ammonium compound complexed with the tetracycline is tallow trimethylammonium chloride.

6. A method in accordance with claim 1 in which $A^-$ is selected from the group consisting of halides, phosphates, sulfates, lactates and stearates.

7. A method in accordance with claim 1 in which said quaternary ammonium compound is a mixture of compounds having an R' group containing from 12 to 18 carbon atoms.

8. A method in accordance with claim 1 which comprises administering 5 to 300 mg/kg/day of said quaternary ammonium compound in unit dosage form.

9. A method in accordance with claim 1 which comprises administering 5 to 1000 mg. of tallow trimethylammonium chloride in unit dosage form.

10. A method in accordance with claim 1 in which said mammal is a dog.

11. A method in accordance with claim 1 in which said mammal is a cat.

12. A method in accordance with claim 1 which comprises administering said quaternary ammonium compound in the amount of about 10 to 20 mgm/kg of body weight daily in cat or dog food compositions.

13. A method according to claim 1, further comprising starting administration of said compound after mating.

* * * * *